(12) United States Patent
Ballard et al.

(10) Patent No.: US 10,770,109 B2
(45) Date of Patent: Sep. 8, 2020

(54) TAPE DRIVE CONFIGURATION

(71) Applicant: HEWLETT PACKARD ENTERPRISE DEVELOPMENT LP, Houston, TX (US)

(72) Inventors: Curtis C Ballard, Fort Collins, CO (US); Carl R Hoerger, Boise, ID (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/022,879

(22) Filed: Jun. 29, 2018

(65) Prior Publication Data

US 2020/0004467 A1 Jan. 2, 2020

(51) Int. Cl.
| | |
|---|---|
| *G11B 15/68* | (2006.01) |
| *G11B 20/12* | (2006.01) |
| *G11B 23/04* | (2006.01) |
| *G11B 33/10* | (2006.01) |

(52) U.S. Cl.
CPC .......... *G11B 20/1205* (2013.01); *G11B 15/68* (2013.01); *G11B 15/689* (2013.01); *G11B 15/6835* (2013.01); *G11B 23/042* (2013.01); *G11B 23/046* (2013.01); *G11B 33/10* (2013.01); *G11B 2220/90* (2013.01)

(58) Field of Classification Search
None
See application file for complete search history.

(56) References Cited

U.S. PATENT DOCUMENTS

| | | | | |
|---|---|---|---|---|
| 5,418,971 A | * | 5/1995 | Carlson | G06F 3/0611 360/92.1 |
| 5,819,309 A | * | 10/1998 | Gray | G06F 3/0613 711/111 |
| 8,612,697 B2 | | 12/2013 | Massey et al. | |
| 8,682,470 B2 | * | 3/2014 | Greco | G11B 15/689 360/92.1 |
| 9,047,879 B2 | | 6/2015 | Inch et al. | |

(Continued)

FOREIGN PATENT DOCUMENTS

| | | | | |
|---|---|---|---|---|
| JP | 63222308 A | * | 9/1988 | |
| JP | 2001135000 A | * | 5/2001 | |

(Continued)

OTHER PUBLICATIONS

Hiraguchi et al. "Recording Tape Cartridge", published Mar. 14, 2003. Machine Translation. (Year: 2003).*

(Continued)

*Primary Examiner* — William J Klimowicz
(74) *Attorney, Agent, or Firm* — Trop, Pruner & Hu, P.C.

(57) ABSTRACT

A method comprising: determining, by a tape library, respective tape densities supported by each of a plurality of tape drives and respective tape densities indicated for each of a plurality of tape cartridges; receiving, by the tape library, a command to load a given one of the tape cartridges into a given one of the tape drives; determining, by the tape library, that the indicated tape density for the given tape cartridge matches a tape density supported by the given tape drive; and in response to the determination that the tape densities match, configuring, by the tape library, the given tape drive to initialize the given tape cartridge to the tape density indicated for the given tape cartridge.

8 Claims, 3 Drawing Sheets

(56) References Cited

U.S. PATENT DOCUMENTS

| | | | |
|---|---|---|---|
| 9,058,843 B2 | 6/2015 | Iwanaga et al. | |
| 9,063,542 B2* | 6/2015 | Greco | G11B 15/689 |
| 9,141,542 B1 | 9/2015 | Justiss et al. | |
| 9,142,224 B2 | 9/2015 | Hansen et al. | |
| 9,349,410 B2* | 5/2016 | Greco | G11B 15/6835 |
| 9,495,561 B2* | 11/2016 | Greco | G06F 21/78 |
| 10,170,152 B1* | 1/2019 | Hoerger | G11B 23/042 |
| 2006/0180694 A1* | 8/2006 | Battles | G11B 23/042 242/348 |
| 2007/0214311 A1 | 9/2007 | Burchfield et al. | |
| 2018/0088836 A1* | 3/2018 | Freitag | G06F 3/0619 |
| 2019/0095353 A1* | 3/2019 | Hoerger | G06F 12/1408 |
| 2019/0303020 A1* | 10/2019 | Hasegawa | G06F 3/0661 |

FOREIGN PATENT DOCUMENTS

| | | | | |
|---|---|---|---|---|
| JP | 2003077255 A | * | 3/2003 | |
| JP | 2003297040 A | * | 10/2003 | G11B 23/042 |
| JP | 2010027189 A | * | 2/2010 | |
| JP | 2015130216 A | * | 7/2015 | G06F 3/0604 |
| WO | WO-9729484 A2 | * | 8/1997 | G11B 27/002 |

OTHER PUBLICATIONS

Miyabe. "Tape Library System and Inventory Control Method", published Feb. 4, 2010. Machine Translation. (Year: 2010).*

JP201027189, Tomohiro Miyabe document, filed Feb. 4, 2010; translated by: Schreiber Translations, Inc. (Year: 2010).*

Fortuna Data, "LTO Ultrium Roadmap," (Web Page), Aug. 16, 2013, http://www.ltoultrium.com/lto-ultrium-roadmap/.

International Business Machines Corporation, "Hardware Reference," IBM Magstar 3590 Tape Subsystem, Sep. 2000.

International Business Machines Corporation, "IBM Enterprise vs LTO Tape Drive Comparison," Jan 26, 2019, <https://www.ibm.com/downloads/cas/NA1ZAKAV>.

International Business Machines Corporation, "IBM TotalStorage 3494 Tape Library: A Practical Guide to Tape Drives and Tape Automation," Feb. 2009, <http://www.redbooks.ibm.com/redbooks/pdfs/sg244632.pdf>.

International Business Machines Corporation, "IBM® TS1150 Tape Drive: Protecting Critical Data," 2017.

International Business Machines Corporation, "Label Specification for IBM 3592 Cartridges when used in IBM Libraries (Revision 2.2)," Feb. 2009, <http://www-01.ibm.com/support/docview.wss?uid=ssg1S7000727&aid=1>.

International Business Machines Corporation, "Medium Reuse at Higher (or Lower) Densities," SCSI Reference, IBM System Storage Tape Drive 3592, Section 4.11, May 25, 2012, p. 106.

International Business Machines Corporation, "Selecting the Density/Format," SCSI Reference, IBM System Storage Tape Drive 3592, Section 412, May 25, 2012, pp. 107-108.

International Business Machines Corporation, Excerpts from "Hardware Reference," IBM Magstar 3590 Tape Subsystem, Sep. 2000, Chapter 1 and excerpts from Chapter 2 (Mode Select and Mode Sense commands), pp. i-ii, 1-4, and 74-91.

Hewlett Packard Enterprise, LT08 Type M for HPE Midrange Automation, Aug. 2017, 13 Pgs.

* cited by examiner

TAPE DRIVE CONFIGURATION

BACKGROUND

Storage systems may store digital information in a tape cartridge. A tape drive is an electronic device that can read data from, write data to, and initialize a tape cartridge. A tape cartridge may house a reel of tape and may be loaded into the tape drive to make the tape cartridge available for reading, writing, and/or initialization. A tape cartridge may also include an indication (such as a bar code) to indicate what tape density the tape cartridge should be initialized to.

BRIEF DESCRIPTION OF THE DRAWINGS

Non-limiting examples of the present disclosure are described in the following description, read with reference to the figures attached hereto and do not limit the scope of the claims. In the figures, identical and similar structures, elements or parts thereof that appear in more than one figure are generally labeled with the same or similar references in the figures in which they appear. Dimensions of components and features illustrated in the figures are chosen primarily for convenience and clarity of presentation and are not necessarily to scale. Referring to the attached figures:

DETAILED DESCRIPTION

In the following detailed description, reference is made to the accompanying drawings which form a part hereof, and in which is depicted by way of illustration specific examples in which the present disclosure may be practiced. It is to be understood that other examples may be utilized and structural or logical changes may be made without departing from the scope of the present disclosure.

Some tape storage formats specify that a tape drive may configure previous generations' tape cartridges to different tape densities. Additionally, once a tape drive configures a tape cartridge, the tape cartridge may be locked at the tape density the tape drive configured the tape cartridge to. A tape cartridge may include a bar code. The bar code may indicate the tape density the tape cartridge is to be configured to. The tape drive may not know which format or tape density to configure the tape cartridge to, regardless of the bar code included on the tape cartridge.

Examples described herein include a tape library. The tape library may include various components, such as, but not limited to, a tape cartridge picker, a plurality of tape cartridges (of varying versions, generations, and/or types), a plurality of tape drives (of varying versions, generations, and/or types), a processing resource, and a machine-readable storage medium. The tape library may receive commands from a user or computing device to move or load tape cartridges into one of the plurality of tape drives. The tape drive may configure, initialize, and/or write data to the tape cartridge. The tape cartridge picker may, in response to the move or load tape cartridge command, check the destination tape drive to determine if multiple tape densities are supported. Each tape cartridge may include a bar code. The tape cartridge picker may include a bar code reader. The tape cartridge picker may read the bar code of the tape cartridge and, based on the bar code and the determination that the tape density is supported by the tape drive, configure the tape drive to configure or initialize the tape cartridge to a tape density indicated by the bar code on the tape cartridge (as in, a non-default and/or supported tape density).

Accordingly various examples may include a tape library to determine the supported tape densities of each of a plurality of tape drives in the tape library and an indicated tape density of each of a plurality of tape cartridges in the tape library. The tape library may receive commands to load a tape cartridge of the plurality of tape cartridges into one of a tape drive of the plurality of tape drives. The tape library may determine that the indicated tape density of the tape cartridge matches one of a supported tape densities of the tape drive. In response to the determination that the indicated tape density of the tape cartridge matches one of the supported tape densities of the tape drive, the tape library may configure the tape drive to initialize the tape cartridge to the indicated density of the tape cartridge.

Figure 1:
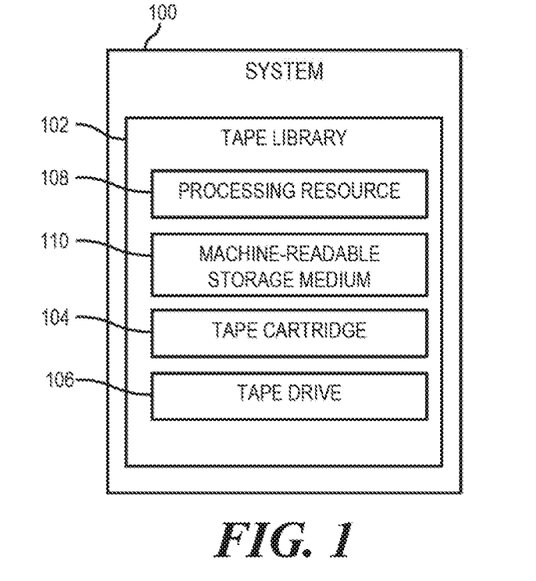
FIG. 1 is a block diagram of an example system including a tape library, a tape cartridge, a tape drive, a processing resource, and a machine-readable storage medium.

FIG. 1 is a block diagram of an example system 100 including a tape library 102, a tape cartridge 104, a tape drive 106, a processing resource 108, and a machine-readable storage medium 110. System 100 may include a tape library 102. The tape library 102 may include various components, such as a tape cartridge picker, a processing resource 108, and/or a machine-readable storage medium 110. The tape library 102 may also include a tape cartridge 104, a plurality of tape cartridges, a tape drive 106, and/or a plurality of tape drives. The tape library 102 may include a machine-readable storage medium 110 encoded with instructions executable by a processing resource 108. The executable instructions may include instructions to scan all the tape cartridges and tape drives included in the tape library 102 or system 100 and determine an indicated tape density and/or supported tape density/densities, respectively. In response to the determination of the indicated tape densities and supported tape densities, the tape library 102 may store the information in the machine-readable storage medium 110 (the machine-readable storage medium 110 accessible by the tape library 102). The executable instructions may include instructions to generate commands or receive commands, from a user or application, to load or move a tape cartridge 104 to a tape drive 106. The executable instructions may include instructions to check the tape density indicated by the tape cartridge 104 against the tape densities supported by the tape drive 106. If the tape density indicated by the tape cartridge 104 matches one of the tape densities supported by the tape drive 106, the tape library 102 may configure the tape drive 106 to initialize the tape cartridge 104 to the tape density indicated by the tape cartridge 104.

As used herein, a "computing device" may be a storage array, storage device, storage enclosure, server, desktop or laptop computer, computer cluster, node, partition, virtual machine, tape library or any other device or equipment including a controller, a processing resource, or the like. In examples described herein, a "processing resource" may include, for example, one processor or multiple processors included in a single computing device or distributed across multiple computing devices. As used herein, a "processor" may be at least one of a central processing unit (CPU), a semiconductor-based microprocessor, a graphics processing unit (GPU), a field-programmable gate array (FPGA) to retrieve and execute instructions, other electronic circuitry suitable for the retrieval and execution instructions stored on a machine-readable storage medium, or a combination thereof.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Any machine-readable storage medium described herein may be non-transitory.

As used herein, a "tape library" may be a computing device that may include a tape cartridge, a plurality of tape cartridges, a tape drive, a plurality of tape drives, a tape cartridge picker, a plurality of tape cartridge pickers, or some combination thereof. The tape library may also include a user interface, a connection, or interconnect to connect to a user interface or a computing device to facilitate management functions. For example, the tape library may include a keyboard, video monitor, and mice (KVM) connection. In another example, the tape library may include a management port.

As used herein, a "tape drive" may include a device that reads data from and writes data to a tape cartridge. A tape drive may be included in a tape library or may be a separate component. A tape drive may support various generations of various formats. In an example, a tape drive may support various generations of the Linear Tape-Open™ (LTO™) format. In another example, a tape drive may support various generations of the LTO™ format and various generations of other formats. A tape drive may initialize, configure, and/or format uninitialized tape cartridges to various tape densities. The tape drive may support initialization of tape cartridges to one or more tape densities. A tape library may configure the tape drive to initialize a tape cartridge to a specific tape density, the specific tape density indicated by the tape cartridge.

As used herein, a "tape cartridge" may include a plastic enclosure containing one or more reels of magnetic tape for data storage. In an example, the tape cartridge may support a format, such as the LTO™ format. A tape cartridge may be one of a number of different colors, the color indicating the generation of the format the tape cartridge supports. A tape cartridge may or may not include a bar code. The bar code may indicate which tape density the tape cartridge may be initialized to. For example, the LTO™ format allows for tape cartridges to include a character in the seventh spot of part of the bar code. If the seventh character is an M, then the bar code is indicating a non-default tape density. Otherwise, a tape cartridge may indicate (for example, with an L as the seventh character) a default tape density. Other characters may be utilized for different purposes. In other words, different characters, when placed in the seventh character position, may be defined to have different meanings. A user may add a barcode to a tape cartridge. A tape cartridge may include other means to indicate a tape density, such as a radio-frequency identification (RFID) tag or chip, a machine-readable storage medium, or some other means.

As used herein, "LTO™" may refer to a magnetic tape data storage format. The LTO™ format may dictate certain specifications regarding tape cartridges, tape density, compression, and other factors. For example, LTO-8™ may allow for a tape drive to format or initialize tape cartridges to different tape densities. In a further example, a tape drive that supports multiple tape densities may format or initialize a tape cartridge from a previous generation to a higher tape density. In a further example, the tape drive may be a LTO-8™ tape drive and the tape cartridge may be a LTO-7™ tape cartridge that indicates (for example, by a barcode included on the tape cartridge), a denser than normal tape density (or in other words, a non-default tape density).

As used herein, "tape density" may refer to the amount of data a tape cartridge may be able to store. Further, tape density may refer to the amount of data stored per square inch of magnetic tape (for example, 200 Gbits per square inch of magnetic tape). Tape density may also be reported by the amount of data stored per square centimeter.

Figure 3:
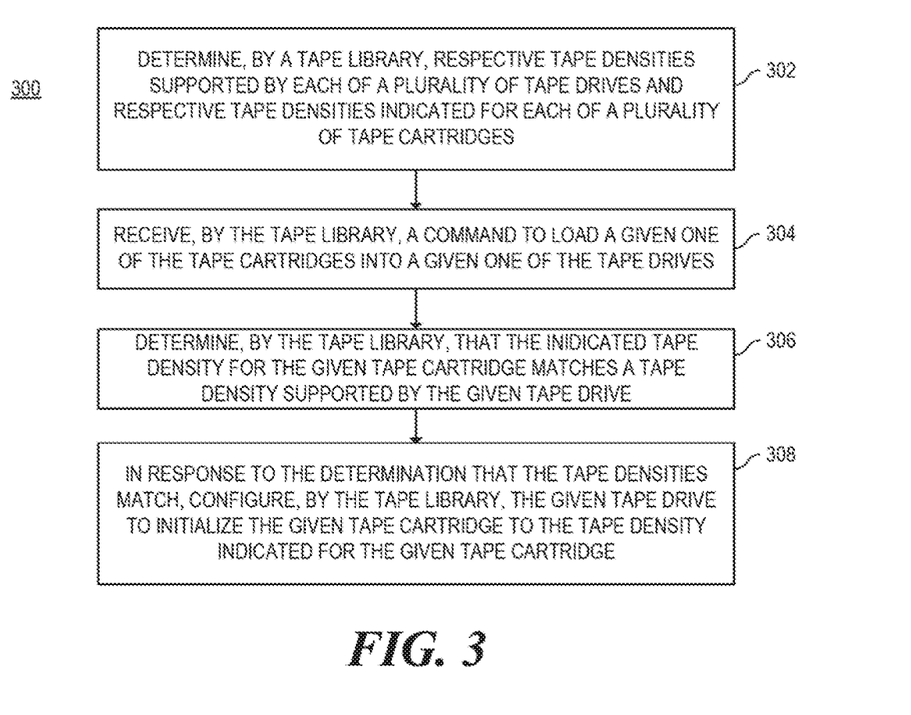
FIG. 3 is a flow chart of an example method to configure a tape drive to initialize the tape cartridge to a supported tape density.

FIG. 3 is a flow chart of an example method to configure a tape drive 106 to initialize the tape cartridge 104 to a supported tape density. Although execution of method 300 is described below with reference to the system 100 of FIG. 1, other suitable systems or modules may be utilized, including, but not limited to, system 200 or computing device 400. Additionally, implementation of method 300 is not limited to such examples.

At block 302, a tape library 102 may determine the supported tape densities of each of a plurality of tape drives (or of a single tape drive, e.g., tape drive 106) and an indicated tape density of each of a plurality of tape cartridges (or of a single tape cartridge, e.g., tape cartridge 104). In an example, the tape library 102 may include one tape drive 106, a plurality of tape drives (including tape drive 106), one tape cartridge 104, a plurality of tape cartridges (including tape cartridge 104), a processing resource 108, a machine-readable storage medium 110, or some combination thereof. In an example, the tape library 102 may take an inventory or scan the contents of the tape library 102. The tape library 102 may perform such actions (or similar actions) upon power on, upon boot, at some point after boot, at some pre-determined point in time, or at the prompt of a user. The tape library 102 may take an inventory of all the tape cartridges (including tape cartridge 104) stored in the tape library 102. The results of the inventory may include whether the tape cartridge 104 is initialized, the type of tape cartridge 104 (in other words, the format a tape cartridge 104 supports and the version of that format), the amount of data stored in the tape cartridge 104, and the tape density of the tape cartridge 104 (which may be indicated by a barcode on the tape cartridge 104, by the lack of a barcode on the tape cartridge 104 and the type of tape cartridge 104, by a RFID tag included on the tape cartridge, or by some other means). In a further example, the tape library 102 may determine such data by retrieving a tape cartridge 104, via a tape picker, and scanning the barcode, RFID tag, and/or a machine-readable storage medium 110 within the tape cartridge 104. In another example, the tape library 102 may determine the tape density or tape densities supported by a tape drive 106 or plurality of tape drives (including tape drive 106). The tape drive 106, as noted, may support one tape density or a plurality of tape densities. The tape library 102 may determine the supported tape densities of the tape drive 106 by sending a command from the tape library 102 to the tape drive 106, requesting the supported tape densities of the tape drive 106. In response to such requests, the tape drive 106 may provide the requested data to the tape library 102. The tape library 102 may also send a request for the format/formats a tape drive 106 supports and the version of that supported format/formats (for example, LTO-8™).

As noted, the tape library 102 may include a tape picker. "Tape picker" may refer to the entire assembly that picks, places, and/or moves the tape cartridges (e.g., tape cartridge 104). A tape picker may also be referred to as a robot, transport, gripper, or carriage (such references may include other terms, such as tape, cartridge, some other similar term, or some combination thereof; for example, a tape picker may refer to a tape cartridge gripper or a tape robot). A tape picker may include a barcode reader/scanner and/or some other component capable of scanning a machine-readable storage medium included on the tape cartridge 104. For example, the tape picker may include an RFID reader capable of reading an RFID tag or chip. A tape picker may include a processing resource and/or a machine-readable storage medium.

At block 304, the tape library 102 may receive a command to load a tape cartridge 104 into a tape drive 106. The tape library 102 may receive the command from another device, computing device, or from a user prompt. In another example, the tape library 102 may generate the command for various reasons, such as routine tape cartridge 104 maintenance, tape cartridge 104 initialization, or various other functions. For example, a tape library 102 may include multiple tape cartridges and multiple tape drives. In such examples, the tape cartridges included in the tape library may include initialized tape cartridges, uninitialized tape cartridges, or some combination thereof. In response to an inventory of the contents of the tape library 102, a user prompt, or some other event; the tape library 102 may receive a command to initialize a tape cartridge 104.

At block 306, the tape library 102 may determine whether the indicated tape density of the tape cartridge 104 matches one of a supported tape densities of the tape drive 106. The command to load a tape cartridge 104 into a tape drive 106 may specify the tape cartridge 104 and tape drive 106. The tape library 102 may utilize the data from the inventory or scan described above. Utilizing such data, the tape library 102 may determine whether the tape cartridges 104 tape density is supported by the tape drive 106. In other words, the tape library 102 may determine whether the tape drive 106 is capable of initializing the tape cartridge 104 to the tape density indicated by the tape cartridge 104 (the tape density indicated, for example, by a bar code on the tape cartridge 104 or lack of a bar code on the tape cartridge 104 and type of tape cartridge 104).

At block 308, the tape library 102 may, in response to a determination that the indicated tape density of the tape cartridge 104 matches one of the supported tape densities of the tape drive 106, configure the tape drive 106 to initialize the tape cartridge 104 to the indicated tape density of the tape cartridge 104. In an example, the tape cartridge 104 may indicate a default tape density or a non-default tape density. As noted above, the tape cartridge 104 may indicate a tape density based on a barcode included on the tape cartridge 104. Additionally, a tape cartridge 104 may indicate a tape density based on a lack of a bar code included on the tape cartridge 104. Further the tape cartridge 104 may indicate a tape density based on the type of tape cartridge 104 (in other words, the format supported by the tape cartridge 104). Stated another way, a tape cartridge 104 may indicate a default tape density based on the format and version of the format that the tape cartridge 104 supports (for example, the tape cartridge 104 may support LTO™ version 7).

In another example, the tape cartridge 104 may not indicate a supported tape density of the tape drive 106. In such examples, the tape library 102 may configure the tape drive 106 to initialize the tape cartridge 104 to a default tape density. As noted above, the tape cartridge 104 may indicate a default tape density by the version of the format supported by the tape cartridge 104. For example, the tape cartridge 104 may be an LTO-7™ tape cartridge 104. In another example, the tape cartridge 104 may include a machine-readable storage medium (for example, an RFID tag). Further, the machine-readable storage medium may store data that indicates the default tape density of the tape cartridge 104.

In another example, in response to the completion of configuration of the tape drive 106 to initialize a tape cartridge 104 to a tape density indicated by the tape cartridge 104, the tape library 102 may move the tape cartridge 104 into the tape drive 106. In other words, a tape picker may pick or grab the tape cartridge 104 from a storage slot in the tape library 102. Further, the tape picker may move the tape cartridge 104 to the tape drive 106. The tape drive 106 may initialize the tape cartridge 104, in response to the tape cartridge 104 being loaded or moved into the tape drive 106. Further, in response to a reception of an unload command by the tape library 102, the tape library 102 may unload or move the tape cartridge 104 from the tape drive 106. The tape library 102 may check the actual tape density of the tape cartridge 104 (in other words, the tape density that the tape cartridge 104 was initialized to) against the tape density indicated by the tape cartridge 104. In response to the actual tape density of the tape cartridge 104 not matching the tape density indicated by the tape cartridge 104, the tape library 102 may generate a warning. The warning may include a message noting that the tape density of the tape cartridge 104 does not match the indicated tape density of the tape cartridge 104. Stated another way, the warning may indicate that the label or barcode on the tape cartridge 104 may not contain the correct information (as in, the tape cartridge 104 may be mislabeled).

As noted above, FIG. 1 is a block diagram of an example system 100 including a tape library 102, a tape cartridge 104, and a tape drive 106. In an example, the tape library 102 may receive various commands, including, but not limited to, moving a tape cartridge (e.g., tape cartridge 104) from storage (such as, a shelf, container, and/or an area within the tape library 102 where tape cartridges 104 may be stored) to a tape drive (e.g., tape drive 106), move tape cartridges (e.g., tape cartridges 104) from a tape drive (e.g., tape drive 106) to storage, and take inventory of tape drives and tape cartridges (such as, tape drive 106 and tape cartridge 104) within the tape library 102. The tape library 102 may also include a user interface to allow users to input commands, manage the tape library 102, and perform other functions. The tape library 102 may also determine the tape densities supported by tape drives (e.g., tape drive 106) included in the tape library 102 and the tape densities indicated by tape cartridges (e.g., tape cartridge 104) within the tape library 102. The tape library 102 may, in response to the reception of a message or command to move a tape cartridge 104, determine whether the tape density indicated by a barcode included on a tape cartridge 104 matches a supported tape density of a destination tape drive 106 (destination tape drive 106 meaning the tape drive 106 that may receive the tape cartridge 104). If the indicated tape density is supported by the tape drive 106, the tape library 102 may configure the tape drive 106 to initialize the tape cartridge 104 to the indicated tape density. In response to the completion of configuration of the destination tape drive 106, the tape library 102 may load the tape cartridge 104 into the destination tape drive 106.

In another example, the tape library 102 may check the initialized tape cartridges (e.g., tape cartridge 104) for proper labelling. In such examples, the tape library 102 may check an initialized tape cartridge (e.g., tape cartridge 104) received from a tape drive 106, in response to an unload or a retrieve tape cartridge 104 command received from a user, user interface, computing device, or application. In other words, the tape library 102 may receive an unload or retrieve tape cartridge 104 command. In response to the unload or retrieve tape cartridge 104 command, the tape library 102 may retrieve the tape cartridge 104 from the tape drive 106 and check the tape cartridge 104. The tape library 102 may determine the tape density of the initialized tape cartridge (e.g., tape cartridge 104) and compare that to the indicated tape density of the initialized tape cartridge (e.g., tape cartridge 104). In response to mismatched values, the tape library 102 may generate a warning noting that the initialized tape cartridge (e.g., tape cartridge 104) is mislabeled.

In another example, the tape library 102 may move an already initialized tape cartridge (e.g., tape cartridge 104) to a tape drive 106. In such examples, in response to a locked tape density or format of the tape cartridge 104, the tape drive 106 may not re-format the tape cartridge 104. In another example, in response to the tape cartridge 104 format or tape density not being locked and in response to a reception of a command to re-format a tape cartridge 104 from a user or application, the tape library 102 may configure the tape drive 106 to re-format the tape density of the tape cartridge 104 according to the tape density indicated by the tape cartridge 104.

In another example, if the tape drive 106 does not support multiple tape densities, the tape library 102 may not configure the tape drive 106 to initialize the tape cartridge 104 based on the tape density indicated by the tape cartridge 104. In such examples, the tape library 102 may configure the tape drive 106 to format the tape cartridge 104 to a default tape density. In a further example, if the tape drive 106 does not support the default tape density, the tape drive 106 may generate and send a warning to the tape library 102.

Figure 2:
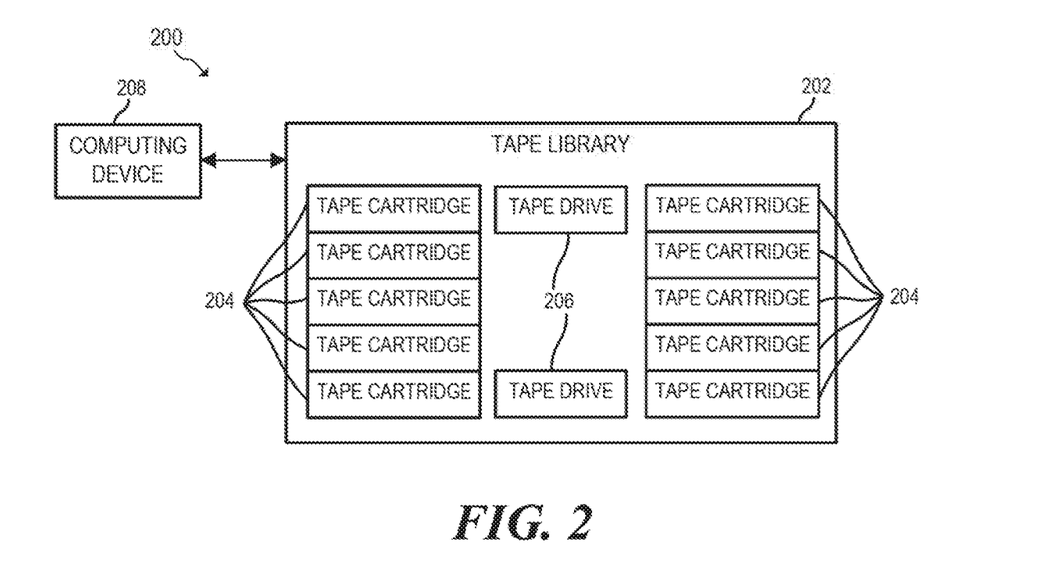
FIG. 2 is a block diagram of an example system including a computing device, a tape library, a plurality of tape cartridges, and a plurality of tape drives.

FIG. 2 is a block diagram of an example system 200 including a computing device 208, a tape library 202, a plurality of tape cartridges 204, and a plurality of tape drives 206. In an example, the tape library 202 may receive commands from the computing device 208. The commands may include a command to load any of the plurality of tape cartridges 204 into any of the plurality of tape drive 206, a command to unload a tape cartridge 204 that has been loaded into a tape drive 206, re-format any of the plurality of tape cartridges 204, and various other commands. In another example, rather than a computing device 208 sending commands, a user interface, disposed on the exterior of the tape library 202, may send the commands. As described above, the computing device 208 may connect to the tape library 202 through a management port, a KVM connection, an Ethernet port, or some other connection suitable for passing commands and receiving data from the tape library 202.

In another example, the tape library 202 may determine the supported tape densities of the plurality of tape drives 206 and the plurality of tape cartridges 204. The tape library 202 may determine the supported tape densities in response to a command from the computing device 208, upon startup, upon power on, or based on some other factor. In response to the reception of a load tape cartridge 204 command by the tape library 202 from the computing device 208, the tape library 202 may retrieve the specified tape cartridge (via a tape picker or other means). The tape library 202 may check the tape density indicated by the specified tape cartridge. In response to the tape density indicated by the specified tape cartridge matching one of a supported tape densities of the specified tape drive (as in, the tape drive to receive the specified tape cartridge), the tape library 202 may configure the specified tape drive to initialize the specified tape cartridge to the indicated tape density. Upon successful completion of the configuration of the specified tape drive, the tape library 202 (for example, via the tape picker) may move the specified tape cartridge to the specified tape drive for initialization.

Figure 4:
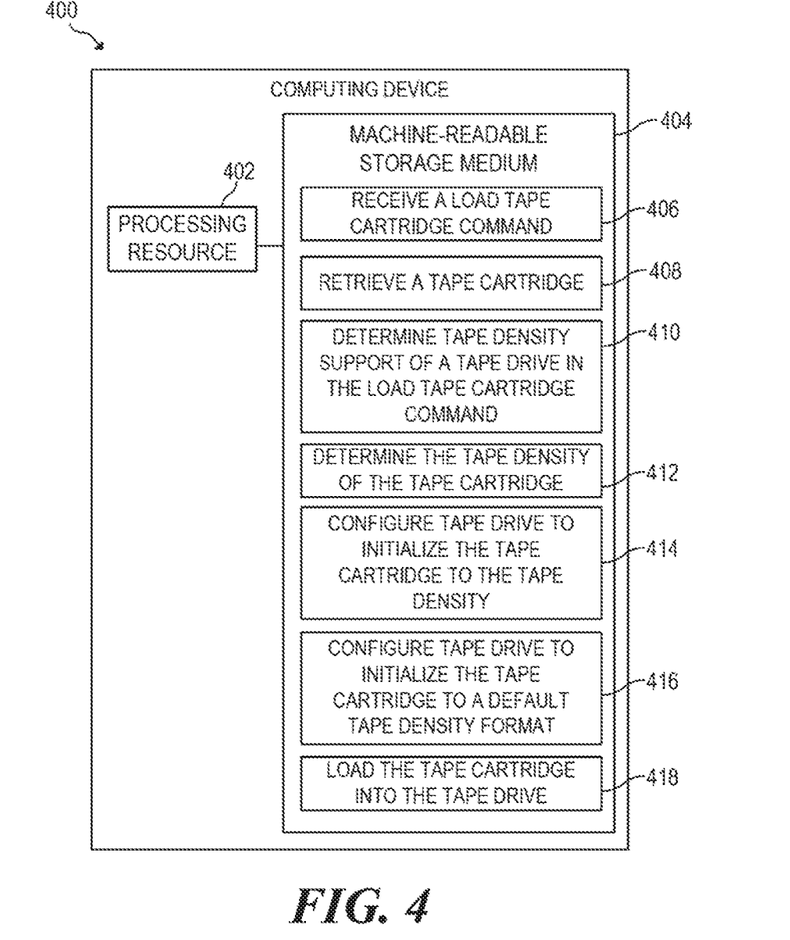
FIG. 4 is a block diagram of an example computing device to configure a tape drive to initialize a tape cartridge according to a tape density specified for the tape cartridge.

FIG. 4 is a block diagram of an example computing device to configure a tape drive to initialize a tape cartridge according to a tape density specified for the tape cartridge. The computing device 400 may include a processing resource 402 and a machine-readable storage medium 404. The processing resource 402 may execute instructions included in the machine-readable storage medium 404. The machine-readable storage medium 404 may include instructions 406 to receive a load tape cartridge command. In an example, the computing device 400 may be a tape library or some other computing device able to manage tape cartridges and tape drives. Further, the computing device 400 may be configured to receive a load tape cartridge command.

The machine-readable storage medium 404 may include instructions 408, when executed by the processing resource 402, to retrieve a tape cartridge. In response to the reception of a load tape cartridge command, the processing resource 402 may execute the instructions 408 to retrieve the tape cartridge. In an example, the load tape cartridge command may identify the tape cartridge to be retrieved or moved. In other words, the load tape cartridge command may include an ID, some string, or some other data identifying the tape cartridge to be retrieved and moved. In another example, the load tape cartridge command may include the destination tape drive for the tape cartridge. In other words, the load tape cartridge may identify the destination tape drive that the tape cartridge to be retrieved is to be moved to.

The machine-readable storage medium 404 may include instructions 410, when executed by the processing resource 402, to determine the tape density support of the tape drive in the load tape cartridge command. In an example, the computing device 400 may execute an instruction to determine tape density support for all tape drives at some pre-determined point before the load tape cartridge command. In such examples, in response to the determination of the tape density or tape densities supported by the tape drive or tape drives, the computing device may store the supported tape densities for each tape drive in a list in the machine-readable storage medium 404 or some other storage included in the computing device 400. In another example, the computing device 400 may execute instruction 410 once for each tape drive included in or associated with the computing device 400. In another example, the computing device 400 may execute instruction 410 in response to the reception of the load tape cartridge command for the tape drive specified in the load tape cartridge command.

The machine-readable storage medium 404 may include instructions 412, when executed by the processing resource 402, to determine the tape density the tape cartridge is to be formatted to. In an example, the tape cartridge may indicate the tape density by a barcode. The tape cartridge may indicate the tape density by some other means, such as by the color of the tape cartridge or the version of a format supported by the tape cartridge. In another example, instructions 412 may be executed at a pre-determined point in time. In another example, the computing device 400 may execute instructions 412 once for each tape cartridge included in or associated with the computing device 400. In another example, the computing device 400 may execute instructions 412 in response to the reception of the load tape cartridge command to retrieve the tape cartridge.

The machine-readable storage medium 404 may include instructions 414, when executed by the processing resource 402, to configure the tape drive to initialize the tape cartridge to the indicated tape cartridge tape density format. The computing device 400 may check the tape density indicated by the tape cartridge against the tape densities supported by the tape drive the tape cartridge may be moved to. In such examples, the tape cartridge may be an un-initialized tape cartridge. In the case that the tape density indicated by the tape cartridge matches one of the tape densities supported by the tape drive (and the tape cartridge is un-initialized), the computing device may configure the tape drive to initialize the tape cartridge to the tape density indicated by the tape cartridge. In an example, the tape density indicated by the tape cartridge may be a non-default tape density.

The machine-readable storage medium 404 may include instructions 416, when executed by the processing resource 402, to configure the tape drive to initialize the tape cartridge to a default tape density format. In an example, the computing device 400 may execute instructions 416 in response to a determination that the tape density format indicated by a barcode on the tape cartridge is the default tape density. In another example, the computing device 400 may execute instructions 416 in response to a determination that the tape density format indicated by the barcode on the tape cartridge is a tape density not supported by the tape drive or if the tape cartridge does not include a barcode or a valid barcode.

The machine-readable storage medium 404 may include instructions 418, when executed by the processing resource 402, to load the tape cartridge into the tape drive. In an example, in response to the completion of configuration of the tape drive to initialize the tape cartridge to a particular tape density (as described above), the computing device may move the tape cartridge to the tape drive. In response to the reception of the tape cartridge by the tape drive, the tape drive may initialize the tape cartridge. In such examples, the tape cartridge may be an un-initialized tape cartridge.

The machine-readable storage medium 404 may include instructions, when executed by the processing resource 402, to unload the tape cartridge from the tape drive. In response to the reception of the unload tape cartridge command, the computing device 400 may execute instructions to get or retrieve the tape cartridge from the tape drive. The computing device 400 may, in response to retrieving the tape cartridge, check the tape density that the tape cartridge is initialized to. The computing device 400 may compare the tape density that the tape cartridge was initialized to against the tape density indicated by the tape cartridge. In response to a mismatch of the actual tape density of the tape cartridge and the indicated tape density of the tape cartridge, the computing device 400 may execute instructions to generate a warning indicating that the tape cartridge is mislabeled.

Although the flow diagram of FIG. 3 shows a specific order of execution, the order of execution may differ from that which is depicted. For example, the order of execution of two or more blocks or arrows may be scrambled relative to the order shown. Also, two or more blocks shown in succession may be executed concurrently or with partial concurrence. All such variations are within the scope of the present disclosure.

The present disclosure has been described using non-limiting detailed descriptions of examples thereof and is not intended to limit the scope of the present disclosure. It should be understood that features and/or operations described with respect to one example may be used with other examples and that not all examples of the present disclosure have all of the features and/or operations illustrated in a particular figure or described with respect to one of the examples. Variations of examples described will occur to persons of the art. Furthermore, the terms "comprise," "include," "have" and their conjugates, shall mean, when used in the present disclosure and/or claims, "including but not necessarily limited to."

It is noted that some of the above described examples may include structure, acts or details of structures and acts that may not be essential to the present disclosure and are intended to be examples. Structure and acts described herein are replaceable by equivalents, which perform the same function, even if the structure or acts are different, as known in the art. Therefore, the scope of the present disclosure is limited only by the elements and limitations as used in the claims

What is claimed is:

1. A method comprising:
    determining, by a tape library, multiple tape densities supported by a given tape drive of a plurality of tape drives and respective tape densities indicated for each of a plurality of tape cartridges;
    receiving, by the tape library, a command to load a given tape cartridge of the plurality of tape cartridges into the given tape drive of the plurality of tape drives;
    determining, by the tape library, that an indicated tape density for the given tape cartridge matches one of the multiple tape densities supported by the given tape drive, wherein the indicated tape density for the given tape cartridge is determined from a barcode on the given tape cartridge;
    in response to the determination that the indicated tape density for the given tape cartridge and one of the multiple tape densities supported by the given tape drive match, configuring, by the tape library, the given tape drive to initialize the given tape cartridge to the indicated tape density for the given tape cartridge; and
    in response to a determination that the given tape cartridge does not include a valid barcode, configuring, by the tape library, the given tape drive to initialize the given tape cartridge to a default tape density for the given tape cartridge.

2. The method of claim 1, wherein the default tape density for another tape cartridge is based on a type of the another tape cartridge.

3. The method of claim 2, wherein the type of the another tape cartridge is indicated by a generation of the tape format supported by the another tape cartridge.

4. The method of claim 1, further comprising:
    loading, by the tape library, the given tape cartridge into the given tape drive;
    in response to a reception of an unload command by the tape library, unloading, by the tape library, the given tape cartridge from the given tape drive into the tape library; and
    determining, by the tape library, that the tape density that the given tape cartridge is initialized to matches the tape density indicated by the barcode on the given tape cartridge.

5. The method of claim 4, further comprising:
    in response to a determination that the tape density that the given tape cartridge is initialized to does not match the tape density indicated by the barcode on the given tape cartridge, generating, by the tape library, a warning to indicate an incorrect label in a tape library notification.

6. A method comprising:

determining, by a tape library, multiple tape densities supported by a given tape drive of a plurality of tape drives and respective tape densities indicated for each of a plurality of tape cartridges;

receiving, by the tape library, a command to load a given tape cartridge of the plurality of tape cartridges into the given tape drive of the plurality of tape drives;

determining, by the tape library, an indicated tape density for the given tape cartridge and that the indicated tape density matches one of the multiple tape densities supported by the given tape drive;

in response to the determination that the indicated tape density for the given tape cartridge is a non-default density and that the non-default density matches one of the multiple tape densities supported by the given tape drive, configuring, by the tape library, the given tape drive to initialize the given tape cartridge to the indicated tape density for the given tape cartridge; and in response to the determination that the indicated tape density for the given tape cartridge is a default density or that the given tape cartridge does not include a valid barcode and that the default density matches one of the multiple tape densities supported by the given tape drive, configuring, by the tape library, the given tape drive to initialize the given tape cartridge to the default density for the given tape cartridge.

7. The method of claim 6, further comprising:

loading, by the tape library, the given tape cartridge into the given tape drive;

in response to a reception of an unload command by the tape library, unloading, by the tape library, the given tape cartridge from the given tape drive into the tape library; and determining, by the tape library, that the tape density that the given tape cartridge is initialized to matches the tape density indicated by a barcode on the given tape cartridge.

8. The method of claim 7, further comprising:

in response to a determination that the tape density that the given tape cartridge is initialized to does not match the tape density indicated by the barcode on the given tape cartridge, generating, by the tape library, a warning to indicate an incorrect label in a tape library notification.

* * * * *